Jan. 31, 1961   J. C. TYGART   2,969,921
MEANS FOR SPOT SPRAYING AGRICULTURAL LAND
Filed Feb. 17, 1959

INVENTOR.
JAMES C. TYGART,
BY
*Shepherd & Caughill*
ATTORNEYS

United States Patent Office 2,969,921
Patented Jan. 31, 1961

2,969,921

MEANS FOR SPOT SPRAYING AGRICULTURAL LAND

James C. Tygart, 509 W. Washington St., Nashville, Ga.

Filed Feb. 17, 1959, Ser. No. 793,828

5 Claims. (Cl. 239—99)

This invention relates to means for spot marking agricultural land that is being treated or is to be treated. More specifically it relates to a spot sprayer that is mounted upon a traveling land treating machine, such for example as a tractor that is being used to impart movement to a fertilizer distributer. The function of the spraying apparatus is to so mark the land, that the driver of the tractor can see, at a glance, just where the fertilizer has been applied and thus may drive the tractor along such a line as will insure that no untreated gap is left.

While the device is particularly useful in applying fertilizer it may be used in any relation where the treatment being used is of such nature that the passage of the vehicle over a run of the land does not leave such easily visible marks as will enable the driver of the tractor to see, with certainty, where the next run of the vehicle should be directed.

Figure 1:
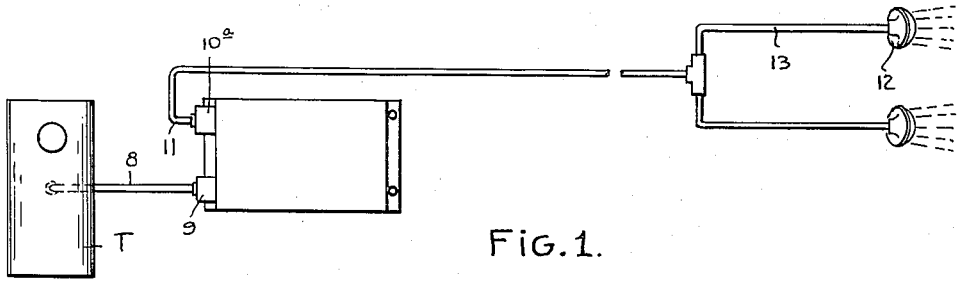
Figure 2:
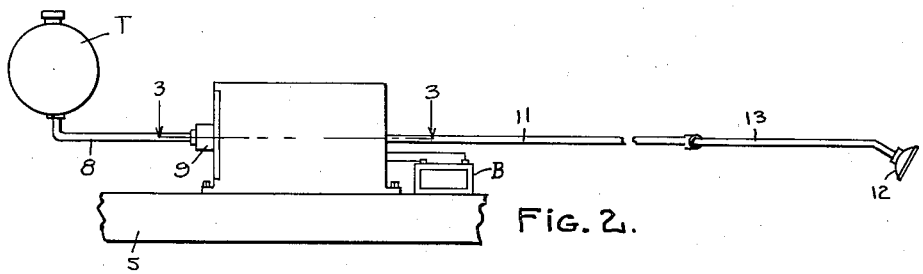
Figure 3:
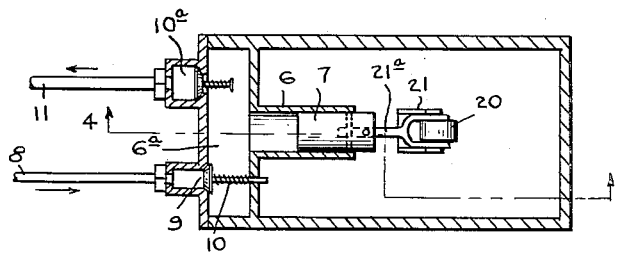
Figure 5:
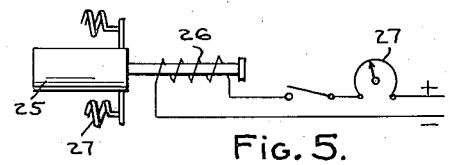
Figure 4:
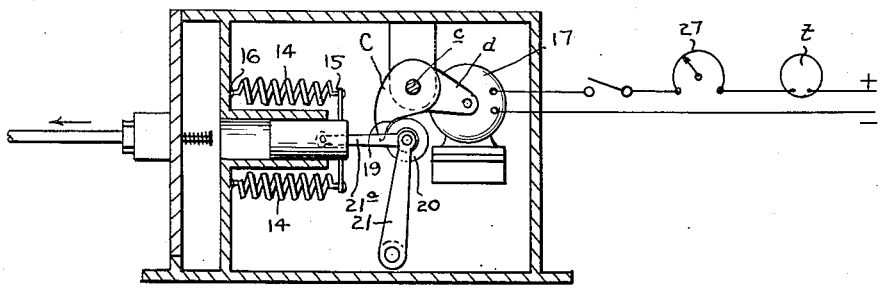

One structure adapted to secure the desired results in a facile economical and efficient way is shown in the accompanying drawing, wherein:

Figure 1 is a plan view of the device,
Figure 2 is a side elevation,
Figure 3 is a horizontal section on line 3—3 of Figure 2,
Figure 4 is a vertical section on line 4—4 of Figure 3,
Figure 5 is a detail sectional view of a modified form of the device.

Since it is very common to mount spraying apparatus upon agricultural tractors it is not deemed necessary to illustrate a tractor. It suffices to say that in the drawing 5 designates any part of a moving vehicle, such as the tractor itself or a fertilizer distributor, or like land treating element, being towed by the tractor.

The spot spraying apparatus comprises a pump cylinder 6 and a pump plunger 7, reciprocable in the cylinder. The cylinder comprises or is connected to a valve chamber 6a. A supply tank T for the spraying material is connected by supply pipe 8, with the valve chamber 6a through the medium of an intake valve 9. This valve opens against the tension of spring 10 when suction is created in the cylinder by outward movement of the plunger and closes under inward movement of the plunger.

A discharge valve 10a controls the passage of the fluid content of the cylinder to a discharge pipe 11 when the plunger moves inwardly in the cylinder and this discharge pipe is connected to one or more conventional spray heads 12 through pipe 13.

An essential and novel feature of the invention resides in taking the liquid dye or marking medium into the cylinder during the travel of the tractor between the spots to be marked and then very quickly ejecting such dye at and only at, said spots. To this end, the ejecting movement of the plunger is under the action of a stout spring or springs 14, attached at its outer end 15 to the plunger and at their inner ends 16 to the cylinder, or other fixed part of the structure.

The reason that the ejecting action must be quick and powerful is that the complete ejecting cycle must be completed so fast that all of the ejected liquid may land at about the same spot and not be strung out in a line. By thus discharging all the liquid at once and concentrating it in a "spot" this area is sufficiently marked through the use of only a very small quantity of dye. In fact I find that less than a teaspoonful per spot will serve the desired end. If this same concentration were carried out throughout the line of travel the cost for dye material would be prohibitive.

An important feature of this invention resides in the fact that since the placing of the discharge spring or springs under tension is effected over the somewhat extended period of time which elapses in the travel of the vehicle from spot to spot, I can, by suitable reducing gearing, use an electric motor of such low current consumption that said motor may be driven from the electrical supply, such as battery B of a conventional agricultural tractor, indicated at 5. It may be stated that these tractors travel at a rate of about five miles per hour. Attention is directed to the fact that in this invention the dye material is put under presure by an element (electrical motor) which is wholly independent of the propulsion elements of the tractor, or like ground treating machine. Consequently the spacing between the marked spots is not tied to the rate of travel of the tractor. It is not necessary to place the material in tank T under pressure. Upon the contrary the pressure imposed upon the material to be discharged is through the slow suction and quick discharge pump of this invention. The only source of power available upon and movable with the tractor and which is independent of the rate of forward travel of the tractor is the electrical energy (the battery) inherent in the ignition system. The conception of the utilization of this source of power to actuate the pump is of importance because the intake cycle of the pump is spread over the considerable period of time consumed in travel from spot to spot. It is during this extended period that power is being stored in the springs 14, but the battery is adequate to so store the power because the work of doing so is spread over so long a period.

The device of the invention is intended for use under conditions where the area being treated is relatively large and the spot markings are spaced relatively far apart. In this respect it differs from devices actuated by parts, such as check row mechanisms, which must operate frequently and discharge spot markings relatively close together.

To secure the result indicated, I actuate the plunger outwardly, to place spring 14 under tension by the action of a rotative cam C. This cam is mounted upon a shaft c, said shaft being driven at the desired reduced speed through reducing gearing from a quite small electric motor, the casing of the reducing gear, which is of conventional form, being indicated at d, and which motor may receive its actuating current from battery B.

An arcuate portion 19 of the cam acts by contact with a roller 20 mounted upon swinging arm 21, to move the plunger slowly out of the cylinder thus placing the springs 14 under tension and drawing the desired charge of spraying material into the cylinder. When the arcuate portion of the cam leaves roller 20 the now powerfully tensioned spring means 14 is free to shoot the plunger inwardly into the cylinder to thereby discharge the dye content as described. The arm 21 is connected to the plunger by link 21a.

I may if desired actuate the plunger by solenoid action. Such an arrangement is indicated in Figure 5 wherein 25 indicates the plunger, 26 the solenoid winding and 27 the ejecting spring for the plunger. However this is not the preferred form because such solenoid action consumes more current than can be spared from the current generating apparatus of a conventional tractor.

A rheostat 27 may be used to vary the speed of the motor 17 and thus vary the distance between spots at which the dye ejecting action will take place. A simple conventional clock actuated timer may be used to control the energization of the solenoid circuit whereby to determine the frequency of discharge of the dye material.

It is to be understood that the invention is not limited to the particular mechanical structure herein disclosed, said structure being merely explanatory of the invention. Upon the contrary the invention includes within its purview whatever changes fairly fall within either the terms or the spirit of the appended claims.

I claim:

1. Apparatus for spot spraying a guiding and marking dye upon agricultural land along the path traversed by a land treating vehicle, comprising a spraying mechanism mounted upon and traveling with said vehicle, said spraying mechanism including a pump, cylinder and plunger therein, a supply tank for a marking dye connected to said cylinder, a spray boom and head extending outwardly from said cylinder, a source of power upon the vehicle, motor means actuated by said source of power independently of the rate of travel of the vehicle, connections between the motor means and the pump plunger constructed to impart a relatively slow suction impulse to the plunger to draw a marking fluid from the tank into the cylinder during the travel of the vehicle between the positions to be spot marked and another means acting much faster than the last named means upon said plunger to forcibly and quickly discharge the accumulated spray material in spot formation at predetermined spots.

2. A structure as recited in claim 1 wherein the means for imparting intake movement to the plunger comprises an electric motor, while the means for imparting discharge movement to the plunger comprises strong spring elements arranged to be placed under tension by the suction stroke of the plunger.

3. A structure as recited in claim 1 wherein the vehicle is a conventional agricultural tractor and the means for moving the plunger upon its intake stroke consists of an electric motor of small current consumption energized from the electrical system of said tractor, a shaft driven through reducing gearing from said motor whereby the speed of said shaft is greatly reduced in comparison with the speed of the motor, the faster acting means consisting of stout spring means connected to and tending to move the plunger forcibly and quickly upon its discharge stroke and revoluble cam means carried by said shaft and acting through a part only of its revolution to move the plunger against the tension of said spring means to effect the suction stroke of the plunger, said cam means being of such nature as to release the plunger at the completion of the suction stroke of the latter and to permit a quick and powerful discharge stroke of the plunger under the influence of said spring means.

4. A structure as recited in claim 1 wherein the vehicle is a conventional agricultural tractor and the means for moving the plunger upon its intake stroke consists of an electric motor of small current consumption energized from the electrical system of said tractor, a shaft driven through reducing gearing from said motor whereby the speed of said shaft is greatly reduced in comparison with the speed of the motor, the faster acting means consisting of stout spring means connected to and tending to move the plunger forcibly and quickly upon its discharge stroke and revoluble cam means carried by said shaft and acting through a part only of its revolution to move the plunger against the tension of said spring means to effect the suction stroke of the plunger, said cam means being of such nature as to release the plunger at the completion of the suction stroke of the latter and to permit a quick and powerful discharge stroke of the plunger under the influence of said spring means and means for varying the speed of the cam means with relation to the bodily forward speed of the land treating vehicle so as to vary the distance between the points at which the spotting of the land is effected.

5. The combination with a conventional self-propelled agricultural tractor having a spot spraying mechanism mounted thereon, said mechanism comprising a pump consisting of a cylinder, a plunger, and a chamber with which the inner end of the cylinder is in communication, a spray pipe leading from said chamber, a dye supply tank that is under atmospheric pressure only, a pipe connection between said chamber and said tank, a motor, driving connections between the motor and the plunger constructed to impart outward suction movement only to the plunger, spring means connected to the plunger arranged to be placed under tension by and during the outward suction stroke of the plunger, and means for varying the speed of the motor with respect to the forward speed of the tractor, the connections between the motor and plunger being such as to free the plunger therefrom at the completion of the suction stroke of the plunger to permit the quick discharge of the accumulated dye content in the cylinder, under the action of the spring means.

References Cited in the file of this patent

UNITED STATES PATENTS

| 1,151,600 | Lacoin | Aug. 31, 1915 |
| 2,199,421 | Stevens | May 7, 1940 |